US008696779B2

(12) United States Patent
Belmonte et al.

(10) Patent No.: US 8,696,779 B2
(45) Date of Patent: Apr. 15, 2014

(54) DEOILER LAYOUT

(75) Inventors: Olivier Belmonte, Perthes en Gatinais (FR); Muriel Jane Sylvie Borzakian, Saint Germain les Corbeil (FR); Lionel René Henri Weller, Champcueil (FR)

(73) Assignee: SNECMA, Paris (FR)

( * ) Notice: Subject to any disclaimer, the term of this patent is extended or adjusted under 35 U.S.C. 154(b) by 7 days.

(21) Appl. No.: 13/382,404

(22) PCT Filed: Jul. 9, 2010

(86) PCT No.: PCT/EP2010/059935
§ 371 (c)(1), (2), (4) Date: Jan. 5, 2012

(87) PCT Pub. No.: WO2011/004023
PCT Pub. Date: Jan. 13, 2011

(65) Prior Publication Data

US 2012/0102900 A1 May 3, 2012

(30) Foreign Application Priority Data

Jul. 10, 2009 (FR) ..................................... 09 03427

(51) Int. Cl.
*B01D 46/18* (2006.01)

(52) U.S. Cl.
USPC ................... 55/406; 55/400; 55/401; 55/407; 55/408; 55/409; 55/385.1; 55/385.3; 96/187; 96/188; 96/189; 96/216; 96/177; 96/178; 95/261; 95/270

(58) Field of Classification Search
USPC ............. 55/401, 400, 406–409, 385.1, 385.3; 96/187–189, 216, 177–178; 95/261, 95/270
See application file for complete search history.

(56) References Cited

U.S. PATENT DOCUMENTS

| | | | | |
|---|---|---|---|---|
| 4,049,401 | A | 9/1977 | Smith | |
| 6,398,833 | B1 | 6/2002 | Santerre et al. | |
| 2008/0202082 | A1 | 8/2008 | Earith et al. | |
| 2011/0258977 | A1 * | 10/2011 | Dejaune et al. | 55/385.1 |

FOREIGN PATENT DOCUMENTS

| | | | | |
|---|---|---|---|---|
| EP | 1 965 041 A1 | 9/2008 | | |
| FR | 2 299 898 | 9/1976 | | |
| FR | 2 696 655 | 4/1994 | | |
| FR | 2937680 A1 * | 4/2010 | | F01D 25/18 |
| WO | WO 02/36240 A2 | 5/2002 | | |

OTHER PUBLICATIONS

International Search Report issued Sep. 28, 2010 in patent application No. PCT/EP2010/059935.

* cited by examiner

*Primary Examiner* — Dung H Bui
(74) *Attorney, Agent, or Firm* — Oblon, Spivak, McClelland, Maier & Neustadt, L.L.P.

(57) ABSTRACT

A deoiler including a hub mounted on the vent shaft and a cover mounted on the hub between two stop faces which fix the cover avoiding the need to weld or bolt the cover.

6 Claims, 2 Drawing Sheets

DEOILER LAYOUT

BACKGROUND OF THE INVENTION

1. Field of the Invention

The subject of this invention is the layout of a deoiler located at the end of the turbine shaft of a turbomachine.

2. Description of the Related Art

This type of deoiler (for which a description of a model is given in document EP 0 780 546 A) is placed at the exit from an airflow maintained in the machine to transport oil that lubricates bearings or other parts in order to separate air from the oil that is dispersed as a fog before air is released to the exterior, and to send oil to the inlet of the lubrication device. Recovery of oil prevents external pollution, drying of the lubrication circuit or even fire due to deposition on very hot external parts. The model of the deoiler considered herein comprises three main parts: a hub used for assembly and positioning of the deoiler on a vent shaft, concentric with the turbine shaft and projecting beyond the rear of the machine, and extending in front of the turbine shaft; a cover delimiting a housing with the hub; and a filter that may be a honeycomb network contained in the housing, held in place by the cover and responsible for separation of air and oil that is deposited on the walls of the honeycomb when the vent shaft drives the deoiler.

Document EP 0 780 546 A discloses a cover bolted to the hub to hold it in place, but the use of bolts makes the assembly heavier and complicates the assembly. Another solution is to weld the cover to the hub. This solution has the disadvantage that said cover is no longer removable.

Document FR 2 696 655 A discloses a layout in which the cover and a housing closing plate are provided with circular hubs, such that they can be slid onto the vent shaft one after the other. The cover is held in place axially by pins passing through its hub and the vent shaft, and by stop faces forming part of the turbine shaft and the closing plate. The closing plate appears to be held in place by a nut screwed onto the vent shaft. The layout is complicated.

In document FR 2 299 898 A, the hub and the cover are retained axially on the vent shaft between stop faces forming part of a bearing and a nut. The cover also stops in contact with a conical shoulder on the shaft. Once again, the layout is complicated since the vent shaft is required to act as a stop for each of the two elements of the deoiler and shaped accordingly.

BRIEF SUMMARY OF THE INVENTION

The subject of the invention is an improved layout of a deoiler that is also lighter in weight than the bolted deoiler, more easily removable than the welded deoiler and that also gives very good cohesion between the hub and the cover, while allowing a simple assembly on the vent shaft.

According to one general form, the invention relates to a deoiler layout comprising a turbine shaft, a vent shaft surrounded by the turbine shaft, the deoiler comprising a sleeve hub mounted on the vent shaft and a hub plate extending beyond the sleeve, and a cover with a cover plate and a cylindrically shaped spacer surrounding the sleeve, the hub plate comprising a rim in which the spacer is engaged at one end, characterised in that the cover plate is engaged on the sleeve, the sleeve is retained in an elongation direction of the shafts by an element of the vent shaft and an element of the turbine shaft, and the cover plate is held in place in the shaft elongation direction between a first stop plate forming part of the sleeve and a second stop plate forming part of either the sleeve or the turbine shaft.

The cover is held in place exclusively by the stop plates. A large reduction in weight is thus obtained.

Another important innovation of the invention is that the cover is no longer mounted on the vent shaft after the hub, but rather directly on the hub; the vent shaft supports the stop means of only one of the two elements of the deoiler and is therefore simplified; in being retained on the hub by its two opposite ends, the cover is assembled to the hub with much better cohesion; finally, it is easy to layout the hub sleeve to make it support one or both of the stop faces of the cover plate.

The first stop face may be composed of a cleat on the sleeve; the second stop face may be composed of one end of the turbine shaft, or possibly better a ring engaged on the sleeve.

Another aspect of the invention is the deoiler itself, which has the above-mentioned characteristics independently of its mounting position.

BRIEF DESCRIPTION OF THE SEVERAL VIEWS OF THE DRAWINGS

The invention will now be described with reference to the following figures.

DETAILED DESCRIPTION OF THE INVENTION

Figure 1:
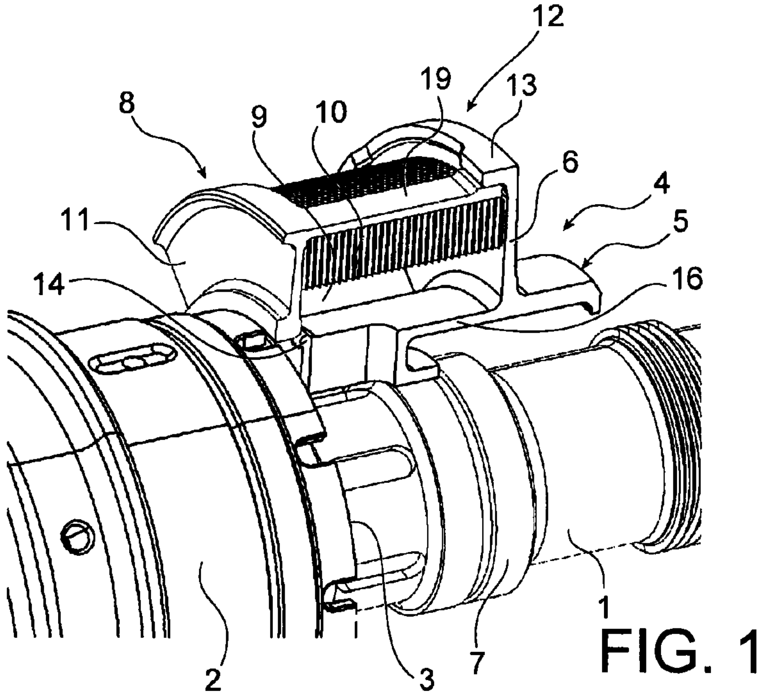
FIGS. 1 and 2 represent a first embodiment of the invention, in a perspective and longitudinal section respectively.
Figure 2:
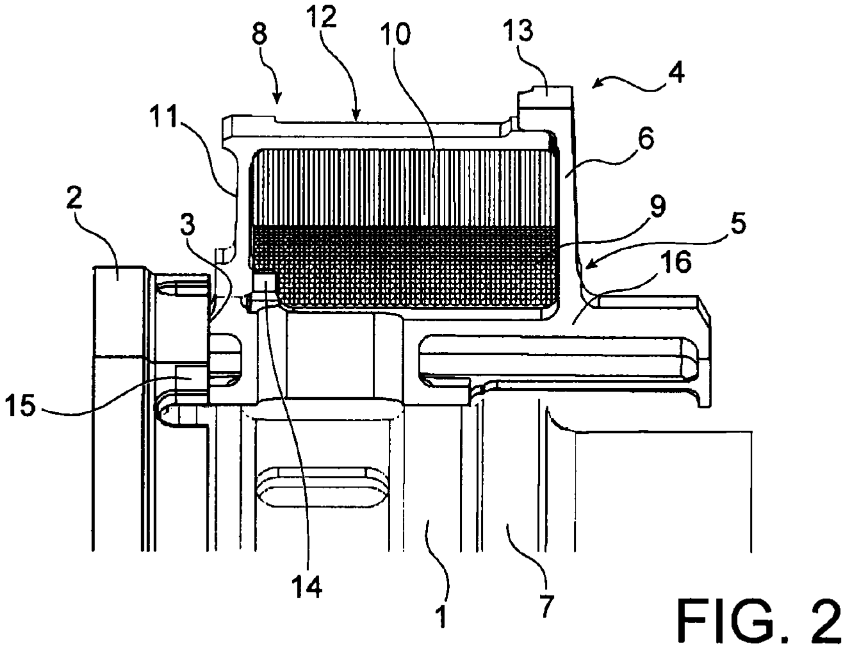

We refer firstly to FIGS. 1 and 2. The layout comprises a deoiler 4, a vent shaft 1, a turbine shaft 2 concentric with the vent shaft and surrounding it; the shafts 1 and 2 extend in a longitudinal direction of the machine to which they belong, the vent shaft 1 projecting beyond one end 3 of the turbine shaft 2 towards the rear of the machine. The deoiler 4 comprises a hub 5 composed essentially of a cylindrical sleeve 16 installed on the vent shaft 1 and stopping in contact with a shoulder 15 of the turbine shaft 2, and a flat hub plate 6 perpendicular to shafts 1 and 2 and extending outside the sleeve 16 forming a single piece with it. A clamping nut 7 screwed onto the vent shaft 1 holds the hub 5 stopped in contact with the shoulder 15. The deoiler 4 also comprises a cover 8 cooperating with the hub 5 to delimit a housing 9 inside which a filter 10 is contained. The housing 9 is delimited by the sleeve 16, the hub plate 6, a cover plate 11 parallel to the hub plate, and a spacer 12 forming part of the cover 8 that is cylindrical and surrounds the sleeve 16 by being concentric with it and with the vent shaft 1. The spacer 12 forms a single piece with the cover plate 11. One end of the spacer 12 opposite the cover plate 11 extends under a rim 13 of the hub plate 6.

The cover 8 is held in place axially by a double stop of the cover plate 11: by the inside face of the housing 9 in contact with a cleat 14 projecting out from the hub 5 stopping movement towards the back of the machine, and by its outside face in contact with the end 3 of the turbine shaft 2 stopping movement towards the front of the machine. However a longitudinal clearance is provided, especially in order to avoid compressing the thin spacer 12 which is perforated and to which large centrifugal forces are applied when in service. This double stop layout means that the cover 8 can be retained without any attachment means other than nesting of parts. It is achieved by placing the hub plate 6 behind the hub 16, unlike normal designs including that in the previous patent, in which this plate is adjacent to the end 3. Cohesion of the assembly is improved by radial nesting of the cover 8 in the hub 5, the cover plate 11 being engaged around the sleeve 16 and the rim 13 surrounding the spacer 12 at the other end opposite the cover 8. The cover 8 is completely separated from the vent shaft 1.

The vent shaft 1, the hub 5 and the spacer 12 are perforated to enable centripetal flow of air through the deoiler 4. The filter 10 is a honeycomb network in which the channels are oriented in the radial direction; its function is to collect oil in suspension in the flow by deposition on the walls of the honeycomb and to discharge it outside as a result of the centrifugal forces mentioned above created by rotation of the deoiler 4, and therefore to allow only perfectly dry air to pass through after completing it centripetal movement, in the vent shaft 1. Although they do not form part of the invention, other details of the environment of the deoiler are given in document EP 0 780 546 A. Other accessories such as balls have been used and could be suitable.

Figure 3:
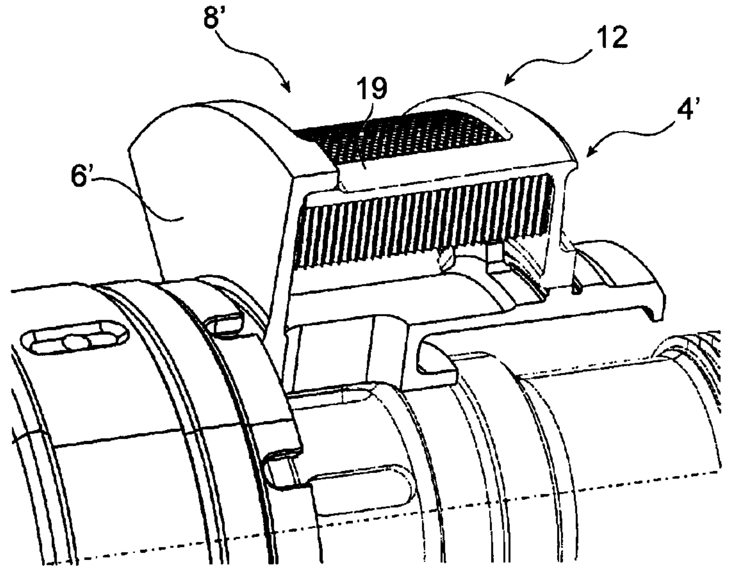
FIGS. 3 and 4 are similar to FIGS. 1 and 2, for a second embodiment of the invention.
Figure 4:
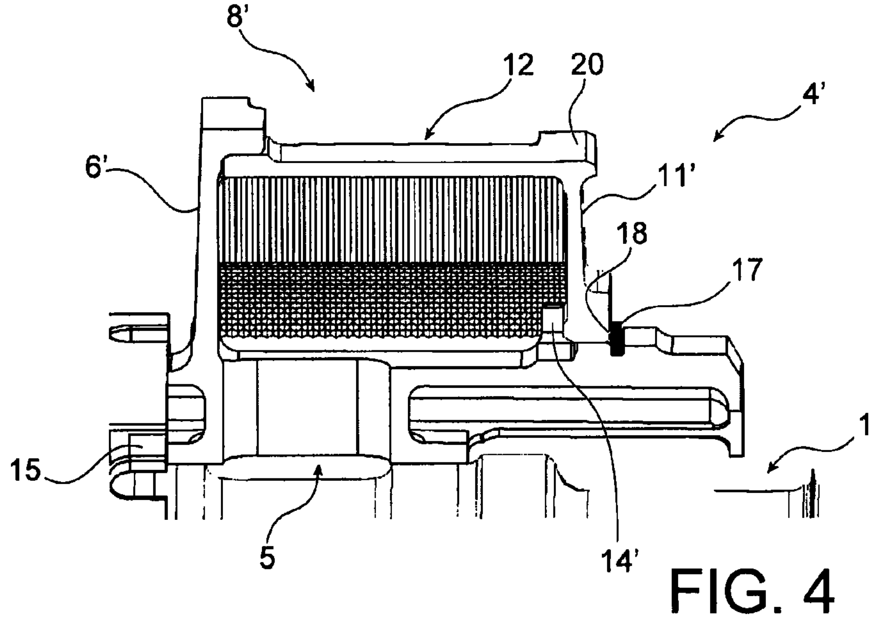

We will now go on to the comments in FIGS. 3 and 4.

A number of elements are similar to the elements in the previous embodiment and have the same reference numbers; however, in this embodiment the hub plate reference 6' and the cover reference 8' are inverted along the deoiler 4, although the shape remains the same; the hub plate 6' is now adjacent to the end 3, and the cover plate 11' is now in front of the deoiler.

The cleat, now 14', remains but is located in front of the hub 5, and it still stops in contact with the internal face of the cover plate 11'. An elastic ring 17 is added in a groove 18 in front of the outside face of the cover plate 11', and stops in contact with this outside face, such that the cover 11' is once again retained in place with no rigid attachment to the hub 5. The advantages of lightweight and ease of assembly of the deoiler are also obtained in this embodiment that has the same essential characteristics as the previous embodiment; assembly of the cover on the hub by a double stop and nesting of the parts, without rigid attachment to the hub by a connecting element.

The same comments are applicable. This embodiment in which the cover 11' is assembled only to the hub 5, is simpler in design than the previous embodiment.

One improvement common to the two embodiments described herein still needs to be mentioned. The spacer 12 is not only thin but it is perforated to enable oil flow by centrifugal force and is therefore composed of a group of straps 19 along its circumference between the hub plate 6 or 6' and the cover plate 11 or 11'. These straps 19 are subject to severe bending due to centrifugal forces, which could create stress concentrations at the location at which they are connected to the cover plate 11 or 11'. One way of overcoming this disadvantage is to provide a rim 20 at the external circumference of the cover plate 11 or 11' at the location at which the cover plate 11 or 11' is connected to the spacer 12, which projects from the side opposite the spacer 12, in other words towards the front end of the machine in the embodiment in FIGS. 1 and 2 and towards the rear in the embodiment in FIGS. 3 and 4, while extending the spacer 12. The overhang of the rim 20 combined with the centrifugal forces applied to it creates bending of the end of the cover plate 11 or 11' which contributes to balancing that applied to it by the spacer 12 and therefore reduces stress concentrations at its outside edge.

The invention claimed is:

1. A deoiler comprising:

a hub including a cylindrically shaped sleeve for mounting on a shaft and with a hub plate extending beyond the sleeve; and a cover including a cover plate and a cylindrically shaped spacer surrounding the sleeve, wherein the hub plate includes a rim in which the spacer is engaged at one end, and the cover plate is engaged around the sleeve and retained in an elongation direction of the shaft by a first stop face forming part of the sleeve.

2. A deoiler according to claim 1, wherein the first stop face includes a cleat on the sleeve.

3. A deoiler according to claim 1, wherein the cover plate includes a projecting rim, opposite the spacer and extending the spacer.

4. A deoiler layout comprising:

a turbine shaft;

a vent shaft surrounded by the turbine shaft;

the deoiler according to claim 1;

wherein the sleeve of the hub is mounted on the vent shaft, the sleeve is retained in an elongation direction of the turbine and vent shafts by an element of the vent shaft and an element of the turbine shaft, and the cover plate is held in place in the shaft elongation direction between the first stop face forming part of the sleeve and a second stop face being secured to either the sleeve or the turbine shaft.

5. A deoiler layout according to claim 4, wherein a second stop face forms part of a ring engaged on the sleeve.

6. A deoiler layout according to claim 4, wherein a second stop face is one end of the turbine shaft.

* * * * *